(12) United States Patent
Vollmer

(10) Patent No.: US 9,563,519 B2
(45) Date of Patent: Feb. 7, 2017

(54) REVERSING CHANGES EXECUTED BY CHANGE MANAGEMENT

(71) Applicant: SAP SE, Walldorf (DE)

(72) Inventor: Michael Vollmer, Leimen (DE)

(73) Assignee: SAP SE, Walldorf (DE)

( * ) Notice: Subject to any disclaimer, the term of this patent is extended or adjusted under 35 U.S.C. 154(b) by 184 days.

(21) Appl. No.: 13/841,536

(22) Filed: Mar. 15, 2013

(65) Prior Publication Data

US 2014/0279928 A1 Sep. 18, 2014

(51) Int. Cl.
G06F 17/30 (2006.01)
G06F 11/14 (2006.01)
G06F 9/44 (2006.01)

(52) U.S. Cl.
CPC .......... *G06F 11/1469* (2013.01); *G06F 8/68* (2013.01)

(58) Field of Classification Search
CPC .... G06F 17/30864; G06Q 10/10; G06Q 30/02
USPC ........................................ 707/679
See application file for complete search history.

(56) References Cited

U.S. PATENT DOCUMENTS

| 6,615,166 | B1 | 9/2003 | Guheen et al. |
| 7,020,880 | B2 | 3/2006 | Mellen-Garnett et al. |
| 7,296,273 | B2 | 11/2007 | Kline |
| 7,761,530 | B2 | 7/2010 | Cain et al. |
| 7,836,429 | B2 | 11/2010 | Clemm et al. |
| 7,904,885 | B2 | 3/2011 | Volkmer |
| 8,091,079 | B2 | 1/2012 | Archambault et al. |
| 8,145,686 | B2 | 3/2012 | Raman et al. |
| 8,418,138 | B2 | 4/2013 | Sriramadhesikan et al. |
| 8,527,471 | B2 | 9/2013 | Hoprich et al. |
| 8,601,121 | B2 | 12/2013 | Kumar |
| 8,793,628 | B1* | 7/2014 | Varma ................. G06F 17/5027 703/13 |
| 2003/0005235 | A1* | 1/2003 | Young ................. G06F 11/1446 711/141 |
| 2006/0155768 | A1* | 7/2006 | Weil et al. ................. 707/104.1 |
| 2006/0155832 | A1 | 7/2006 | Demuth et al. |
| 2009/0132753 | A1* | 5/2009 | Blea et al. ..................... 711/103 |
| 2011/0145553 | A1* | 6/2011 | Levanoni et al. ............ 712/229 |
| 2012/0089625 | A1 | 4/2012 | Bentzien et al. |
| 2013/0097116 | A1 | 4/2013 | Ewanchuk et al. |
| 2014/0040210 | A1* | 2/2014 | Avery et al. .................. 707/661 |
| 2014/0157250 | A1 | 6/2014 | Weckwerth et al. |

(Continued)

*Primary Examiner* — Scott A Waldron
*Assistant Examiner* — Dongming Wang
(74) *Attorney, Agent, or Firm* — Schwegman Lundberg & Woessner, P.A.

(57) ABSTRACT

In an example embodiment, updated repository instances are typically developed on a development system, transferred to a testing system, and after testing, transferred to a production system. Such an updated instance may comprise content, sources and a data dictionary. As an updated instance is moved from one system to another, the change is applied to an original instance. A shadow copy of content is kept for the original instance. In another example embodiment, a shadow copy of content is created as part of the change process. The sources and data dictionary may have their own versioning mechanism. To undo the applied change, the sources and data dictionary are rolled back to their pre-change state. The content is retrieved from the shadow copy and restored to the original instance. Finally, stranded data is restored according to appropriate policies.

17 Claims, 6 Drawing Sheets

(56) References Cited

U.S. PATENT DOCUMENTS

2014/0236887 A1* 8/2014 Nelson et al. ................ 707/610

* cited by examiner

REVERSING CHANGES EXECUTED BY CHANGE MANAGEMENT

TECHNICAL FIELD

This disclosure relates to reversing changes. More particularly, this disclosure relates to reversing changes executed by change management in a repository instance that has content, sources, and a data dictionary.

BACKGROUND

Development of line of business related items may include development, testing and deployment to production systems. Items developed on a development system may be transferred to a testing system and then, after testing, deployed to a production system. As items are moved from one system to another, it is sometimes necessary to "roll back" the changes to a prior release due to a variety of reasons.

DETAILED DESCRIPTION

The description that follows includes illustrative systems, methods, techniques, instruction sequences, and computing machine program products of illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The disclosure herein is broad enough to apply to an entity such as a product, a customer or a product/customer combination. Thus, although the general description is often described in terms of a product, the embodiments herein may apply to any like entity (e.g., customer, product/customer combination).

Figure 1:
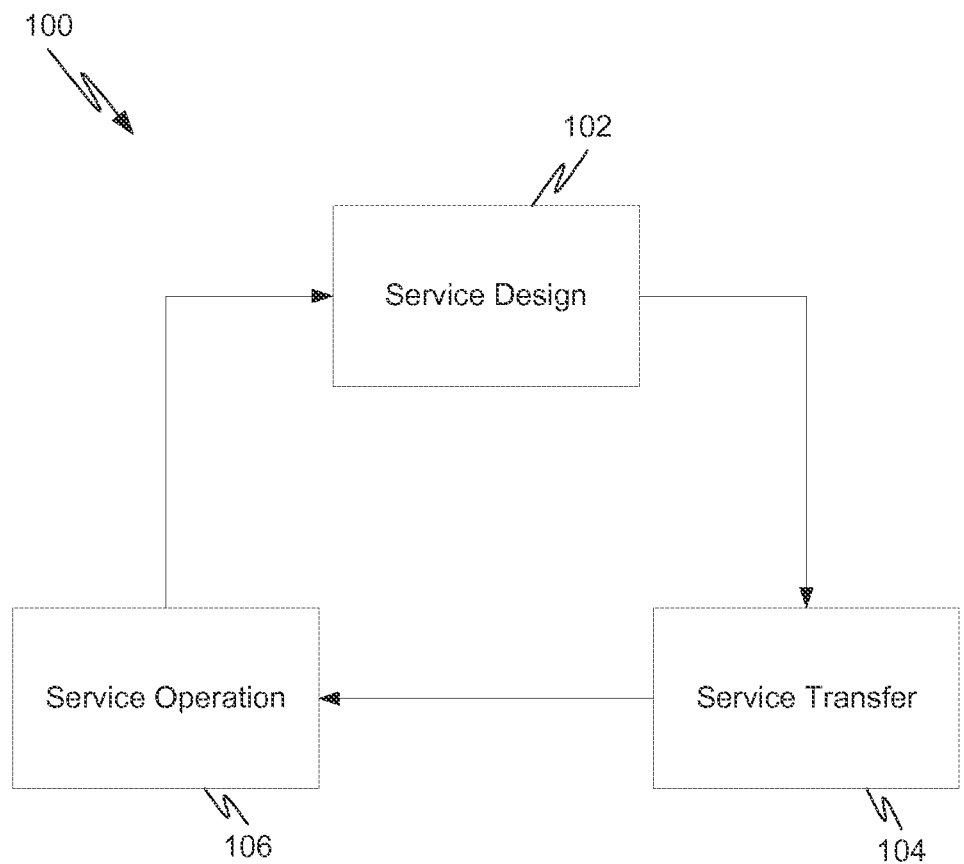
FIG. 1 is a diagram illustrating development, testing and operation.

FIG. 1 is a diagram illustrating development, testing and operation. The system illustrated generally as 100, comprises three main phases and systems. Different development and deployment strategies may include either more or fewer stages and entire books, classes and methodologies have been developed around such principles. However, the diagram of FIG. 1 is sufficient to illustrate basic principles for this disclosure. Service design 102 depicts the first phase. This phase include both design and development. Design may include such things as identifying user requirements, project goals, project constraints, project schedule, project budget, creating project specifications and design documents, etc. The design phase may include any or all steps needed to create the "blueprint" of the project so that actual work may proceed.

Development is where the actual development of the project occurs. This is typically performed in a development environment with various system and tools. In some situations, this could be a developer's desktop. In other situations, this could be system of networked machines including servers, desktops, mobile devices, etc. Generally the development environment will replicate the actual production environment to a greater or lesser degree, so that as pieces are developed, they can be tested to ensure proper operation before moving to the next phase. Development can also include integration where multiple pieces of a larger system are assembled together and tested as an integrated system before moving to the next phase.

Service Transfer 104 represents the phase that occurs before deployment to production. This phase can include, for example, setting the system up in a test environment that replicates the deployment environment and actually exercising the system as if it were deployed. It may also include rigorous stress testing to examine the edges of performance and to test unlikely scenarios to ensure solid and proper operation before the system is actually deployed in a production environment. This phase can also represent user acceptance testing where users or clients can verify operation of the system against their requirements and ensure everything functions properly. This phase may also include staging, which can represent a final QA in a replica of the production environment, including a complete independent copy of production databases.

Service operation 106 represents actual deployment of the system to a production environment. This is where the system is deployed and actual use of the system starts.

Sometimes the illustrated phases are not arranged linearly. Thus, after the system is moved to testing, problems may be found that require various components of the system to be reworked and new versions of those components moved into the testing environment. Often this does not mean the entire system is reintegrated and moved into the testing environment. In many instances, only certain components are changed and moved into the testing environment. This situation also exists when components of a production system are upgraded. In such an upgrade, perhaps only certain items are upgraded while others are not.

At any stage, once such an upgrade has been performed, it is sometimes necessary or desirable to "roll back" the upgrade to a prior point in time or to a prior version of the component. Such a roll back can take many forms, depending on the exact type of system and architecture.

Figure 2:
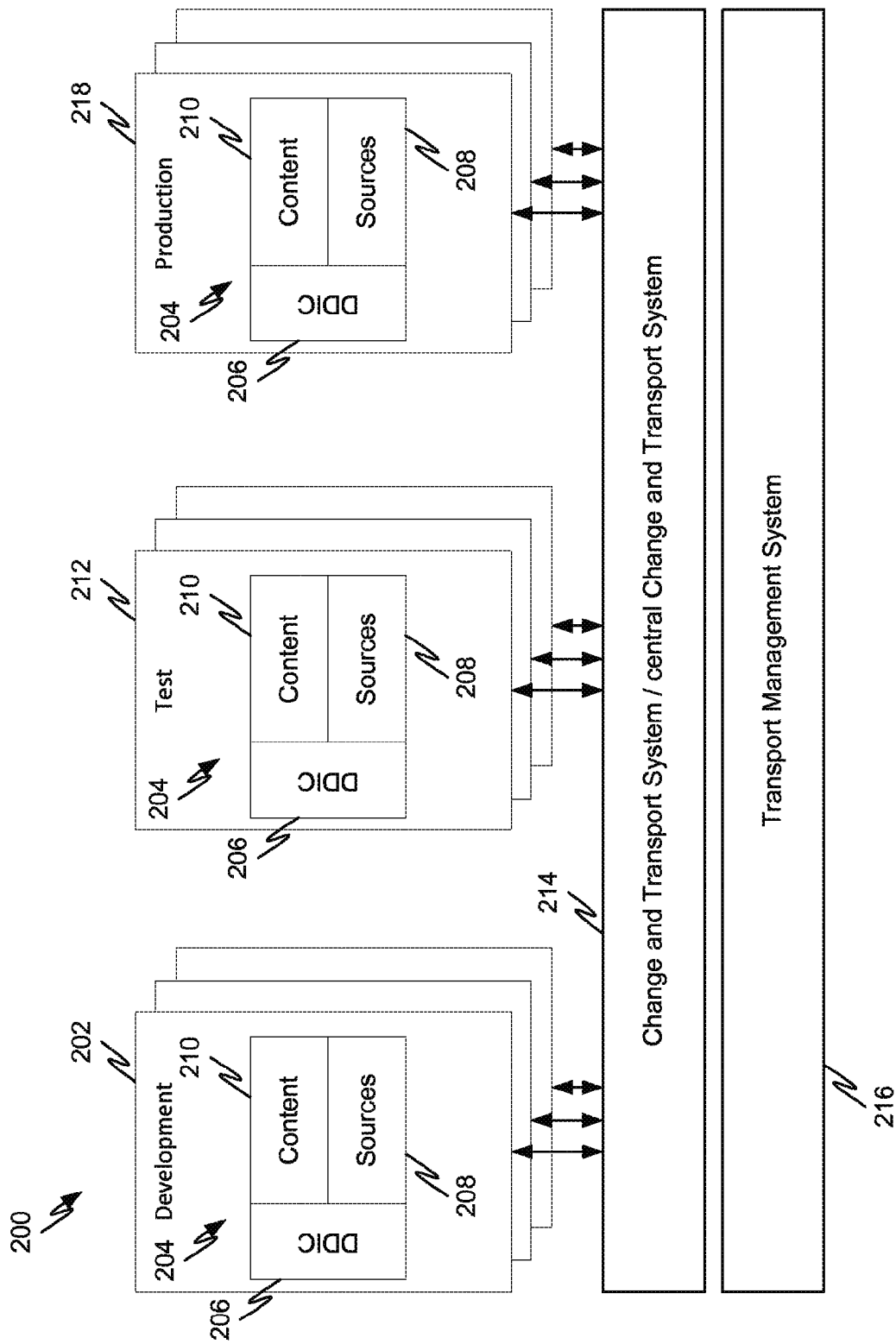
FIG. 2 is a diagram illustrating a system to transfer instances from development to test and to production.

FIG. 2 is a diagram illustrating a system to transfer instances from development to test and to production. The system, illustrated generally as 200, may comprise development systems 202, test systems 212, and production systems 218. Multiple systems in each are illustrated, although in some embodiments one or more may have only single systems.

System 200 may also comprise change and transport system 214 and transport management system 216. Change and transport system 214 may be a set of tools for managing and transporting changes made in one system and distributing between other systems. Examples may include the SAP Change and Transport System or the SAP central Change and Transport System, which makes it possible to combine systems into clusters as well as combining transport requests of these clusters to transport collections and control them together. Transport management system 216 may be a set of tools for organizing, performing and monitoring transports between systems. Transport management system 216 may be accessed by users and/or systems through change and transport system 214. An example may include SAP Transport Management System.

In the embodiment of FIG. 2, the element to be developed, tested and deployed is illustrated by a repository instance, illustrated generally as 204. A repository instance, sometimes referred to as simply an instance, may comprise three major components. In FIG. 2, these components are illustrated as data dictionary 206, sources 208, and content 210. Sources represent executable instructions that may be standardized from a manufacturer as well as customizations made by a particular client or for a particular deployment.

Data dictionary 206 stores information that, among other things, map information in an application to an underlying database. To clarify this further, consider a system such as an inventory system produced by a provider of such systems. The inventory system needs a database to function properly. Various purchasers of the inventory system may utilize different databases. Data dictionary 206 permits a central description of all the data used in the inventory system without redundancies. New or modified information may be automatically provided for all the system components. This ensures data integrity, data consistency and data security.

Information stored in data dictionary 206 may include tables, views, types, domains, search helps and lock objects. Tables are defined in the dictionary independently of the database. A table having the same structure may then be created from this table definition in the underlying database. Views are logical views on more than one table. The structure of the view is defined in the data dictionary. A view on the database can then be created from this structure. Types are used in sources 208. The structure of a type can be defined globally so that changes to a type automatically take effect in all the programs using the type. Lock objects are used to synchronize access to the same data by more than one user. Function modules that can be used in application programs are generated from the definition of a lock object in the data dictionary. Different fields having the same technical type can be combined in domains. A domain defines the value range of all table fields and structure components that refer to this domain.

Content 210 may include transaction data and master data. Transaction data is that data created from operation of the system (such as an inventory system used as an example above). Master data is data associated with the overall system itself.

From the above descriptions it should be clear that as changes are made to an instance, for example the sources are updated or a new field is added to the data dictionary, an impact is also made on the content. For example, if data dictionary is updated to include another field in a table, then content stored in tables in the database is impacted.

Returning to FIG. 2, as instance 204 is moved from development system 202 to test system 212, any existing instances on test system need to be updated. Similarly, as instance 204 is moved from test system 212 to production system 218, any existing instances on production system 218 need to be updated. A suitable update process is described in conjunction with FIG. 3 and FIG. 4 below. If, for any reason, such an update needs to be rolled back, care must be taken to ensure that the data dictionary, the sources and content are all rolled back. Roll back will be discussed in conjunction with FIG. 5 below.

Figure 3:
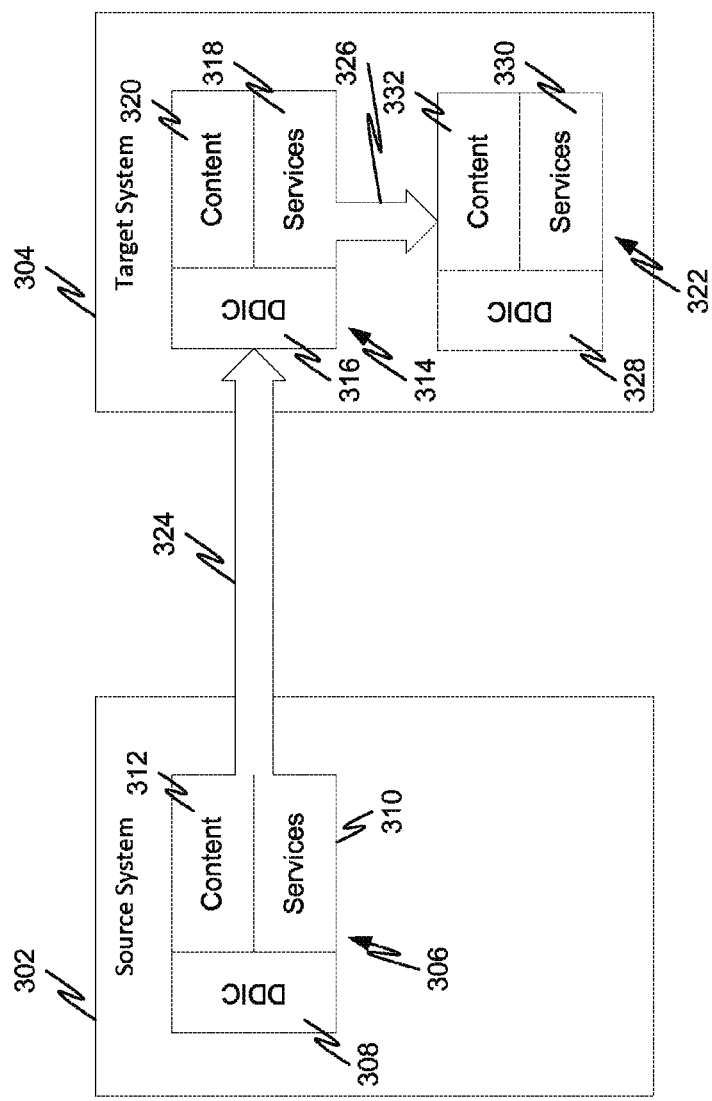
FIG. 3 is a diagram illustrating moving an instance and creating a shadow copy.

Turning now to FIG. 3, a diagram illustrating moving an instance and creating a shadow copy is presented. FIG. 3 illustrates source system 302 and target system 304. Source system 302 represents the system from which the instance will be moved and target system 304 represents the system to which the instance will be moved. Source system 302 may be, for example, a development system or a test system. Target system 304 may be, for example, a test system or a production system. Source system 302 and target system 304 may also be multiple systems in a particular environment.

Instance 306 represents the new instance that is to be moved to target system 304. Instance 306 may comprise data dictionary 308, sources 310, and/or content 312. While instance 306 is illustrated as having data dictionary 308, sources 310 and content 312, not embodiments need include all three parts. In some embodiments, only those items being updated may be included in a new instance. For example, in some embodiments if an update only updates the data dictionary and sources, then a change transferred from source system 302 need only transfer what is changed to target system 304. In other embodiments, parts of a data dictionary, sources, and/or content are transferred. For example, an instance containing a data dictionary, sources, and content may be transferred. However, the content may include only master data and not transactional data and/or the sources may include only "standard" executable instructions without any customizations for a particular customer and/or deployment.

In FIG. 3, target system has instance 314 already existing on the system. Instance 314 may comprise data dictionary 316, services 318, and content 320. Instance 306 is an update to instance 314. In other words, when instance 306 is received by target system 304, instance 306 is a change to instance 314.

Prior to applying any change to instance 314 the state of instance 314 may be preserved in order to allow the change to be reversed or rolled back. In some embodiments, state preservation for data dictionary 316 and sources 318 may already exist, or may exist separately from state preservation for content 320. In other embodiments, state preservation for data dictionary 316, sources 318 and content 314 may be integrated in some fashion.

In one embodiment illustrated in FIG. 3, state preservation for content 320 exists separately from data dictionary 316 and sources 318. State preservation for content 320 may comprise creating a shadow copy 322 of instance 314. In FIG. 3, shadow copy 322 shows data dictionary 328 and sources 330 in dashed lines. This is to illustrate that their state my be preserved separately. Data dictionary 328 comprises the state preservation for data dictionary 316. Sources 330 comprise the state preservation for sources 318.

Shadow copy 322 comprises content 332 as it exists prior to application of any change. Content 322 is the shadow copy for content 320. In one embodiment, shadow copy 322 may be kept up to date so that as changes are made to instance 314 (for example to content 320), the changes may be captured in shadow copy 320 (for example by changes to content 332). Thus, changes made to instance 314 are also made to shadow copy 322. Such changes include, for example, updates to transaction data up to the application of instance 306. As the intent is to preserve the state of instance 314 prior to the application of the changes represented by instance 306, shadow copy 322 will not include the changes created by applying instance 306 to instance 314. In other embodiments, shadow copy 322 is created in response to some triggering event, such as a periodic capture or receipt of changes received from source system 302 to be applied to instance 314. This is explained in further detail with respect to FIG. 4.

Rather than capture all changes to content 320 in shadow copy 322 (either on an ongoing basis or upon some triggering event), shadow copy 322 may only include those items that will be affected by applying a change received from source system 302. In one example, if a field is added to a table and another field deleted from a table, then only content changes affected by the field addition and field deletion are captured in shadow copy 320. The benefit of such an approach is that the storage space for shadow copy 320 is reduced. On the other hand, until the change coming from source system 302 is examined, it is difficult to tell what content will be affected so the content to be captured in shadow copy 322 may not be able to be determined and the shadow copy may not be able to be created before changes are received from source system 302.

As yet another approach, changes made to content 320 may be captured on an ongoing basis so that when a change is received from source system 302 it may be applied without taking the time to create shadow copy 320. Then after the change received from source system 302 is applied, the changes to content 320 that were previously capture may be examined and the content affected by the change from source system 302 captured in shadow copy 322. This type of approach has the benefit of not holding up application of changes received from source system 302 but still reduces the storage space for shadow copy 322.

In summary, existing instance 314 on target system 304 is to be updated by new instance 306 from source system 302. Prior to the update, content 320 is captured in shadow copy 322 as illustrated by arrow 326 to preserve the state of content 320. The capture may be continuous, periodic, and/or upon receipt of the new instance 306 as illustrated by arrow 324. The shadow copy may capture content 320, only changed content of 320 and/or that part of content 320 that will be affected and/or changed by application of new instance 306. The state of data dictionary 316 and/or services 318 may be captured independently of shadow copy 322 or as part of some integrated strategy.

Figure 4:
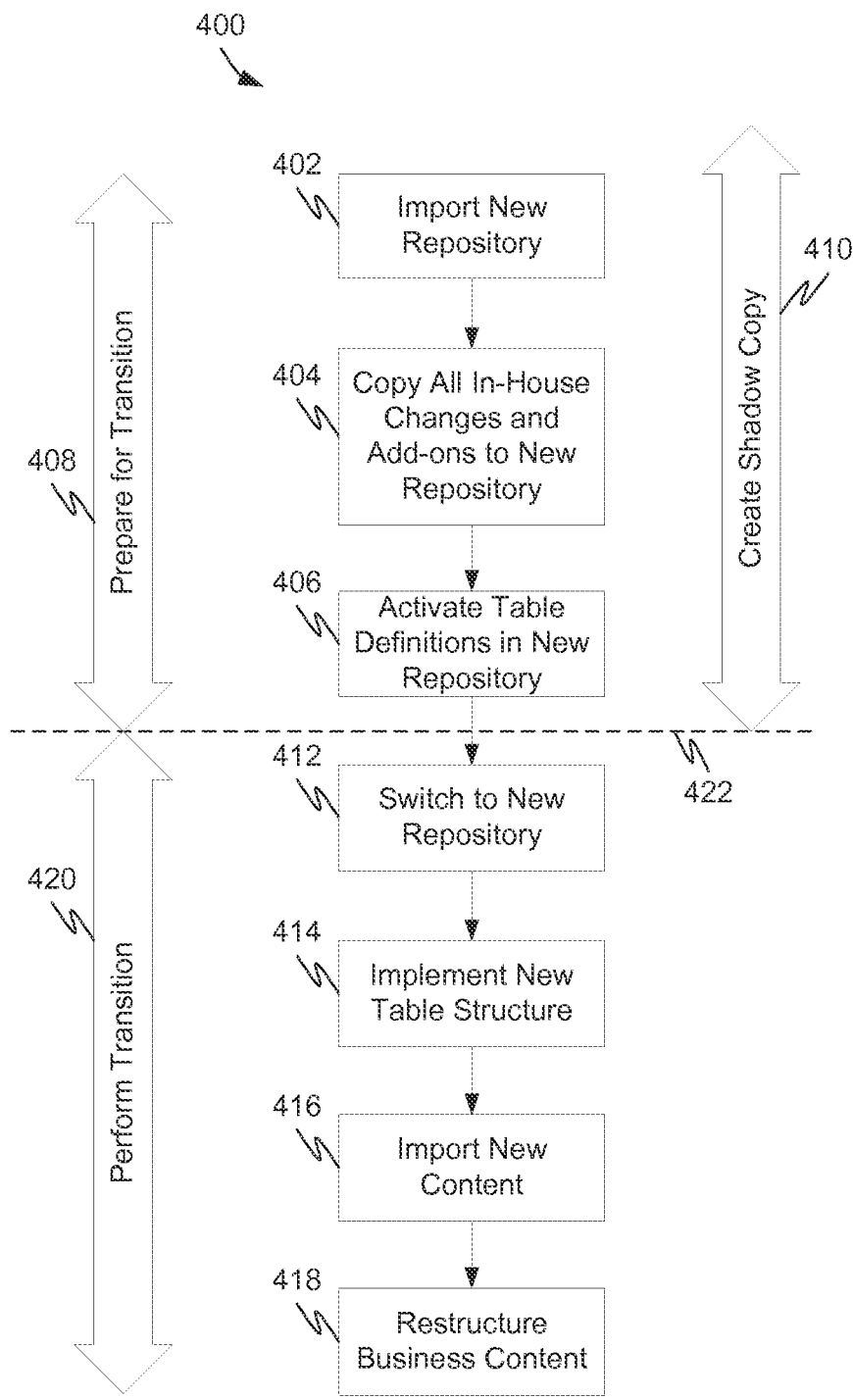
FIG. 4 is a diagram illustrating a method for applying a change.

FIG. 4 is a diagram illustrating a method for applying a change (e.g., moving from an old repository instance to a new repository instance). The method is illustrated generally as 400. The method comprises two major phases, shown by dividing line 422. The first major phase is preparation for transition from the old repository instance to the new repository instance. Arrow 408 illustrates this phase. The second major phase is the actual transition from the old repository instance to the new repository instance. Arrow 420 illustrates this phase.

Preparation for transition begins when the new instance is received or otherwise imported. This is illustrated by block 402. This may occur for example, when a target system, such as target system 304, receives a new instance from a source system, such as source system 302.

When a new instance is received and is to be used, any customizations that exist in the old instance may be preserved and carried over to the new instance. This is illustrated in FIG. 4 by block 404. Such customizations can include changes or add-ons to sources, and/or a data dictionary. Of course, there are situations where customizations may not or should not carry over. In such situations, the affected customizations can be ignored.

After customizations are preserved in the new instance, the table definitions and other information from the new instance data dictionary are activated in the new repository. Block 406 illustrates this process.

Before switching to the new instance, content in the old instance may be preserved. As previously discussed, the content can be preserved in a shadow copy. This is illustrated by arrow 410, which shows that the shadow copy may be created prior to transitioning to the next phase. The shadow copy may be created by capturing changes to content of the old instance in an ongoing manner. The shadow copy may also be created by tracking changes to content of the old instance so the state before transition can be recreated. The shadow copy may also be created by a periodic capture of the content of the old instance. The shadow copy may also be created upon receipt of the new instance. The shadow copy may also be created by some combination of the above. Additionally, the shadow copy may contain all content of the old instance, changes to content of the old instance, and/or content affected by the new instance. Finally if the new repository "replaces" the old repository, the content of the old repository (or some portion of the content of the old repository) may be used for the shadow copy.

After table definitions are activated in block 406, the system switches to the new repository as indicated in block 412. The system then implements the new table structure as shown in block 414. This implementation step may comprise creating new tables in a database, for example.

After the new table structure is implemented, new content is imported into the tables (block 416) and business content is restructured (block 418). These two processes incorporate content contained in the new instance with business and other existing content as well as conform business and other existing content to the new table structure.

Figure 5:
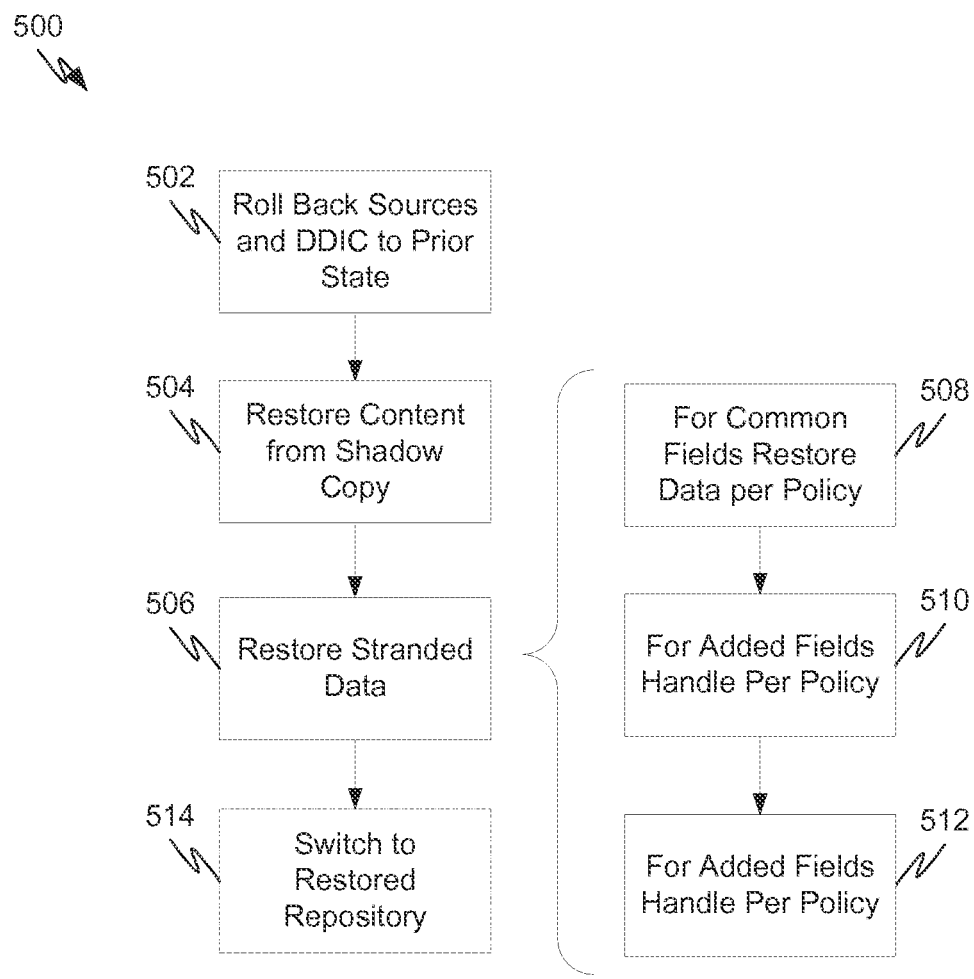
FIG. 5 is a diagram illustrating a method for reversing a change.

For a variety of reasons, sometimes when a new instance is applied, the system needs to be roiled back to the point where it was before the new instance was applied. FIG. 5 is a diagram illustrating a method for reversing a change. FIG. 5 illustrates the method generally as 500. The first part of the method may comprise rolling back the sources and data dictionary to their pre-change state. This is illustrated by block 502. As previously discussed, the data dictionary and sources of an instance may have their own mechanism for preserving state and rolling back to a previous state. In such embodiments, block 502 represents utilizing such mechanisms to roll back their state. During such rollback, care may be taken to handle any customizations or add-ons that were added after the state of the data dictionary and/or sources was preserved, if any. If such exist, they can be handled by some policy, such as discarding them, keeping them, and/or discarding and/or keeping them under certain conditions. In one example, customizations and/or add-ons are kept if they do not conflict with customizations and/or add-ons of the prior state. In another example, customizations and/or add-ons that conflict with the prior state are discarded. In yet a further example, customizations and/or add-ons are always discarded. In yet a further example, customizations and/or add-ons are always kept. As part of block 502, the old tables structure, etc. may be restored, reversing blocks 406, 412, 414 of FIG. 4.

In block 504 content from the shadow copy is restored. Such content may be restored, for example, to the restored table structure.

In block 506, stranded content is handled per policy (not shown). Blocks 508, 510, and 512 represent processes within block 506 and are discussed in greater detail below.

Stranded content includes content created or changed after the shadow copy was created. Such stranded content may break down into various categories. In one example, stranded content includes content that does not conflict with data in the shadow copy. In another example, stranded content includes content that does conflict with content in the shadow copy. In yet another example stranded content may include content that is fully supported in the old instance. In yet a further example, stranded content may include content that is not fully supported in the old instance. In yet a further example, stranded content may be some combination thereof.

If the stranded content is supported by the old instance, then policy can determine what to do with the stranded content, depending on whether it conflicts with the shadow copy or not. This is illustrated in block 508.

When stranded content is supported by the old instance and it does not conflict with the shadow copy content, for example if a new record was added to a table, then the policy may be to copy the stranded content into the old instance. Another policy may be to either delete such content and/or preserve the content. Handling this stranded content is part of block 508 of FIG. 5.

When stranded content is supported by the old instance and it does conflict with shadow copy content, for example if a record that exists in the shadow copy and moved to the new instance was changed in the new instance, then the conflict may be resolved per policy. One way is to select the shadow copy content over the stranded content. Another way is to select the stranded content over the shadow copy content. Additionally, once the conflict is resolved, the non-selected content may be deleted and/or preserved in some fashion. Content may be both deleted and preserved if it is removed from one location and preserved in another. Handling this stranded data is illustrated by block 508.

If the stranded content is not supported by the old instance, the stranded content may be deleted and/or preserved in some manner for later handling. Such stranded content will not generally be copied into the old instance. This is illustrated by block 510.

Finally, if the stranded content is only partially supported, again policy can determine how to handle the content. Block 512 illustrates this process. If content is only partially supported by the old instance, the stranded content may be deleted and/or preserved in some manner for later handling.

Once the instance has been restored to its prior state, the system may switch to the restored repository as illustrated in block 514. As part of this switch, functions such as those illustrated in the transition phase of FIG. 4 (see arrow 420) may be performed.

Figure 6:
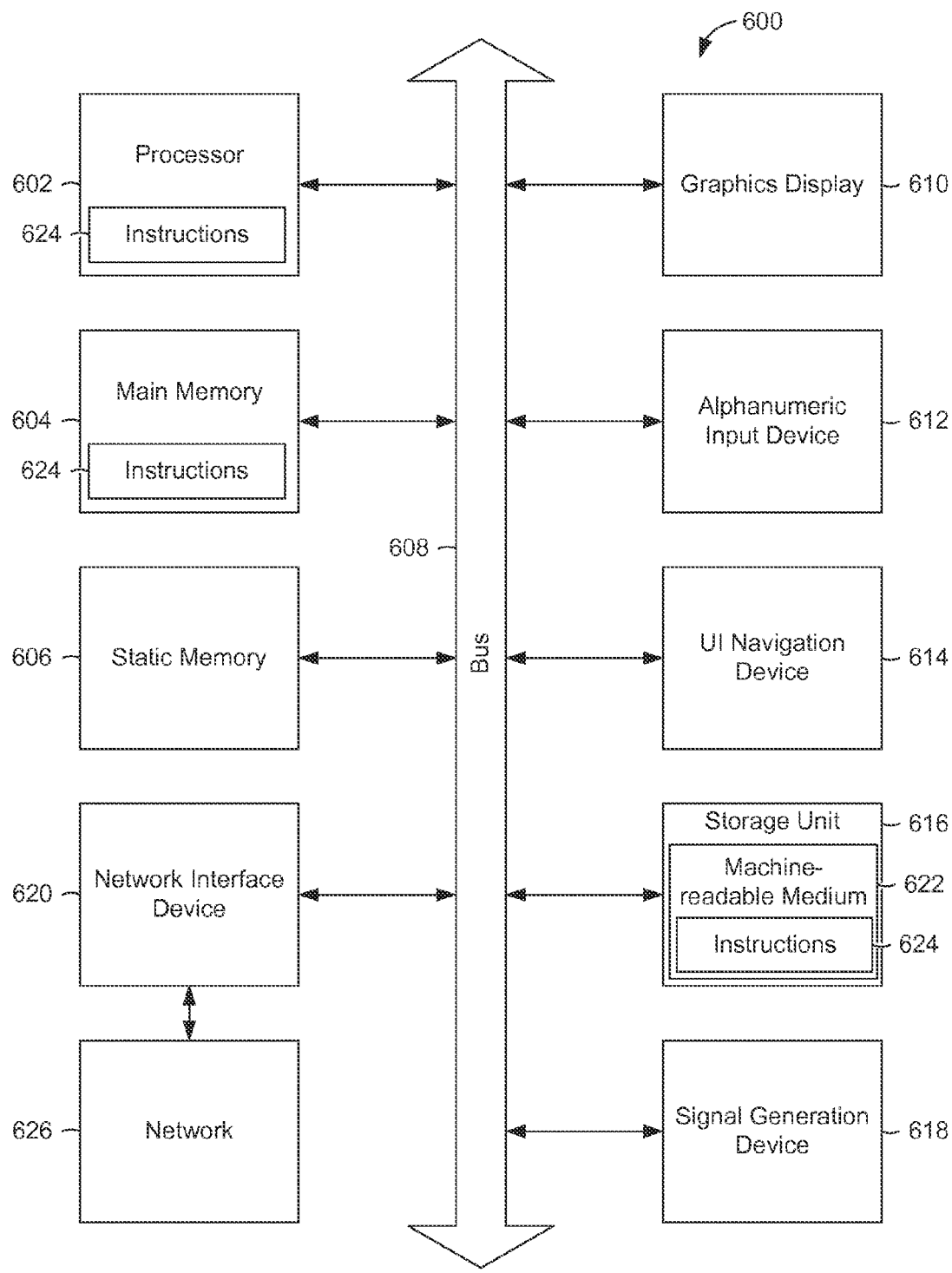
FIG. 6 is a block diagram of a computer processing system, within which a set of instructions for causing the computer to perform any one or more of the methodologies discussed herein may be executed.

FIG. 6 is a block diagram of a computer processing system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 600 includes processor 602 (e.g., a central processing unit (CPU), a graphics processing unit (GPU), advanced processing unit (APU) or some combination thereof), main memory 604 and static memory 606, which communicate with each other via bus 608. The processing system 600 may further include graphics display 610 (e.g., a plasma display, a liquid crystal display (LCD) or a cathode ray tube (CRT) or other display). The processing system 600 also includes alphanumeric input device 612 (e.g., a keyboard), a user interface (UI) navigation device 614 (e.g., a mouse, touch screen, or the like), a storage unit 616, a signal generation device 618 (e.g., a speaker), and a network interface device 620.

The storage unit 616 includes machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the processing system 600, with the main memory 604 and the processor 602 also constituting computer-readable, tangible media.

The instructions 624 may further be transmitted or received over network 626 via a network interface device 620 utilizing any one of a number of well-known transfer protocols (e.g., HTTP).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions 624. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fail within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method comprising:
   accessing, at a machine, an original instance comprising:
      first content comprising transaction data and master data;
      a plurality of first sources, wherein a first source of the plurality of first sources comprises a first set of executable instructions; and
      a first data dictionary comprising first mapping data that associates information in an application to an underlying database;
   generating, at the machine, a shadow copy of the original instance, the shadow copy comprising first shadow copy content, the first shadow copy content comprising shadow transaction data equivalent to the transaction data;
   receiving, at the machine, a first change to the original instance comprising a transaction data update;
   applying, at the machine, the first change to the original instance to generate a changed original instance comprising second content, a plurality of second sources, and a second data dictionary, the second content comprising the transaction data update;
   applying, at the machine, the first change to the shadow copy to generate a changed shadow copy, the changed shadow copy comprising changed shadow copy content comprising the transaction data update;
   receiving, at the machine, a new instance comprising a first difference relative to the changed original instance, wherein the first difference is relative to the second source or relative to the second data dictionary; and
   modifying the changed original instance to generate a second changed original instance, wherein the second changed original instance comprises a second difference relative to the changed shadow copy, and wherein the second difference is equivalent to the first difference.

2. The method of claim 1, further comprising tracking changes to the first content during system operation.

3. The method of claim 1, further comprising:
   detecting a triggering event, wherein the generating of the shadow copy is at least in part responsive to the detecting of the triggering event; and
   capturing the first content in the original instance.

4. The method of claim 1, wherein the modifying of the changed original instance comprises changing the second content.

5. The method of claim 4, wherein the modifying of the changed original instance comprises modifying a portion of the second content that corresponds to a portion of the first shadow copy content.

6. The method of claim 1, further comprising:
   receiving a command to undo the modifying of the changed original instance;
   replacing a third content of the second changed original instance with changed shadow copy content from the changed shadow copy; and
   restoring stranded content.

7. The method of claim 6, wherein restoring stranded content comprises resolving content conflicts per policy.

8. The method of claim 6, wherein restoring stranded content comprises resolving added content fields per policy.

9. A system comprising:
   a computer processor and a computer storage device comprising executable instructions that, when executed, cause the computer processor to perform operations comprising:
      receiving an original instance, the original instance comprising:
         first content comprising transaction data;
         a plurality of first sources, wherein a first source of the plurality of first sources comprises a set of executable instructions; and
         a first data dictionary comprising mapping data that associates information in an application to an underlying database;
      creating a shadow copy of the original instance, the shadow copy comprising first shadow copy content, the first shadow copy content comprising shadow transaction data equivalent to the transaction data;
      receiving a changed instance, wherein the transaction data comprises a plurality of changes applied before receiving the changed instance, and wherein the shadow transaction data also comprise the plurality of changes;
      applying the changed instance to the original instance to create a new instance that comprises a first difference relative to the original instance; and
      receiving a command to undo the applying of the changed instance to the original instance;
      writing, to the new instance, the first shadow copy content from the shadow copy to generate a restored instance, wherein the restored instance corresponds to the original instance;
      identifying stranded content in the new instance comprising a first stranded content item created or changed after the shadow copy was created;
      determining whether the stranded content is supported in the original instance and whether the stranded content conflicts with the first content in the original instance; and handling the stranded content per at least one policy that is based at least in part on whether or not the stranded content is supported in the original instance and whether or not the stranded content conflicts with the original instance.

10. The system of claim 9, wherein the shadow copy is created as the original instance is maintained.

11. The system of claim 9, wherein the shadow copy is created upon a triggering event.

12. The system of claim 9, wherein the first shadow copy content comprises a first shadow copy content portion corresponding to at least a portion of the first content that is changed by the applying of the changed instance to the original instance and wherein the shadow copy does not include second shadow copy content corresponding to any portion of the first content that is be changed by the applying of the changed instance to the original instance.

13. The system of claim 9, wherein the at least one policy results in:
   adding the stranded content to the first content when the stranded content is supported by the original instance and when the stranded content does not conflict with the first content;
   selecting the first content and deleting the stranded content when the stranded content is supported by the original instance and when the stranded content does conflict with the first content; and
   deleting or preserving the stranded content when the stranded content is not supported by the original instance.

14. A computer readable storage medium comprising instructions that, when executed by at least one processor of a machine, configure the machine to:
   receive an original instance, the original instance comprising:
      first content comprising transaction data and master data;
      a plurality of first sources, wherein a first source of the plurality of first sources comprises a set of executable instructions; and
      a first data dictionary comprising mapping data that associates information in an application to an underlying database;
   create a shadow copy of the original instance, the shadow copy comprising first shadow copy content, the first shadow copy content comprising shadow transaction data equivalent to the transaction data;
   receive a first change to the first source, wherein the transaction data comprises a plurality of changes applied before receiving the first change to the first source, and wherein the shadow transaction data also comprises the plurality of changes;
   apply the first change to the original instance to generate a changed original instance;
   receive a command to undo the apply of the first change to the original instance;
   write, to the changed original instance, the first shadow copy content from the shadow copy to generate a restored instance, wherein the restored instance corresponds to the original instance;
   identify stranded content comprising a first stranded content item created or changed after the shadow copy was created;
   determine whether the stranded content is supported in the restored instance and whether the stranded content conflicts with restored content of the restored instance; and
   handling the stranded content per at least one policy that is based at least in part on whether or not the stranded content is supported in the restored instance and whether or not the stranded content conflicts with the restored instance.

15. The computer readable storage medium of claim 14, wherein the shadow copy is created as the original instance is maintained.

16. The computer readable storage medium of claim 14, wherein the shadow copy is created upon receipt of a command to undo the apply the first change to the original instance.

17. The computer readable storage medium of claim 14, wherein the instructions further configure the machine to:
   restore the first data dictionary of the original instance; and
   restore the plurality of first sources of the original instance.

* * * * *